Patented Jan. 12, 1943

2,307,921

UNITED STATES PATENT OFFICE 2,307,921

AZO DYES

Joseph B. Dickey and James G. McNally, Rochester, N. Y., assignors to Eastman Kodak Company, Rochester, N. Y., a corporation of New Jersey No Drawing. Application September 14, 1939
Serial No. 294,937

2 Claims. (Cl. 260—154)

This invention relates to azo compounds and to fibrous materials such as cellulose organic derivatives, silk and wool colored therewith. More particularly it relates to azo compounds having the general formula:

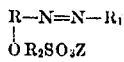

wherein R represents a member selected from the group consisting of a benzene nucleus, and a naphthalene nucleus, each of the said nuclei having at least one sulfoalkoxy group joined to a carbon atom of the nucleus which is ortho, meta, or para to the azo group, $R_1$ represents a member selected from the group consisting of a benzene nucleus, naphthalene nucleus, and a heterocyclic nucleus, $R_2$ represents an alkylene group of at least 2 carbon atoms, and Z represents a member selected from the group consisting of hydrogen, a nitrogen base group, and an alkali forming metal. The various aryl nuclei mentioned may be substituted by one or more monovalent substituents including halogen, represented by chlorine, bromine, and fluorine, alkyl groups, represented by methyl, ethyl, propyl, butyl, cetyl, and the like groups, alkoxy groups, represented by methoxy, and ethoxy groups, and nitro groups. Furthermore $R_1$ may be substituted in para position to the azo bond by an amino group, or a substituted amino group as illustrated in the examples shown hereinafter.

It is an object of our invention, therefore, to prepare the class of azo compounds above described and to color fibrous cellulose organic derivatives, particularly cellulose acetate, silk and wool in the form of threads, yarns, staple fibers, and fabric materials therewith.

The azo compounds of the invention may be prepared by coupling the desired aromatic compounds with the diazo salts of arylamines having the general formula:

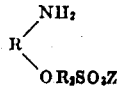

wherein R, $R_2$, and Z have the meanings previously defined. The intermediates illustrated by the above formula may be obtained by treating the desired beta-, gamma-, or omega-haloalkyl aryl ether in alcohol with sodium sulfite, or by condensing the desired phenolic compounds with halogenated alkyl sulfonates in the presence of a suitable basic material. It will be understood that compounds of this type may be halogenated, nitrated, alkylated, arylated, etc.

The following examples illustrate the compounds of our invention and the processes of their preparation.

Example 1

1 mol of 1-amino-2-β-sodium sulfoethoxybenzene is dissolved in 1500 grams of ice and water containing 350 c.cs. of hydrochloric acid and diazotized with 69 grams of sodium nitrite. The diazo solution thus obtained is then added slowly with stirring to 1 mole of dimethyldihydroresorcinol dissolved in 2000 c.cs. of water containing 300 grams of sodium carbonate. When the coupling reaction is complete, the mixture is made acid to litmus with acetic acid, and the dye is salted out, filtered and dried. Cellulose acetate, silk and wool are colored greenish-yellow shades from an aqueous solution of the dye which may contain salt.

The azo compound has the formula:

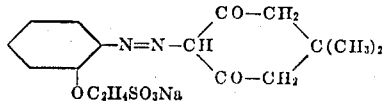

In place of dimethyldihydroresorcinol there may be substituted barbituric acid, 1-phenyl-3-methyl-5-pyrazolone, a tetrahydroquinoline, a pyridine, and similar kind of heterocyclic compounds.

Example 2

1 mole of 1-amino-2-γ-sulfopropoxy-4-nitrobenzene is dissolved in 2000 grams of ice and water containing 300 c.cs. of hydrochloric acid and diazotized with 69 grams of sodium nitrite. 1 mole of diphenylamine is dissolved in 1000 c.cs. of acetic acid, and the diazo solution is added slowly with stirring. The coupling reaction is completed by neutralizing with sodium acetate, sodium carbonate, or similar kind of inorganic base using Congo red paper as an indicator, water is added, and the dye salted out, filtered and dried. Cellulose acetate, silk and wool are colored red shades from an aqueous suspension of the dye.

The azo compound obtained has the formula:

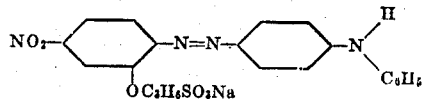

In place of diphenylamine there may be substituted diethylaniline, m-methoxydipropylaniline, β-hydroxyamylaniline, cresidine, glyceryl cresidine, and similar coupling compounds.

Example 3

1 mole of 1-amino-4-γ-sulfopropoxy-2-nitrobenzene is diazotized and coupled with 1 mole of ethyl-β-hydroxyethylaniline following the procedure of Example 2. Cellulose acetate, silk and wool are colored orange shades from an aqueous suspension of the dye.

The azo compound has the formula:

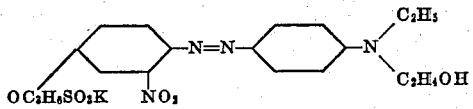

Example 4

(A) 1 mole of 1-amino-6-β-sulfoethoxy-2,4-dinitrobenzene is dissolved in 2500 c. cs. of warm acetic acid and the solution then cooled quickly to room temperature.

(B) 76 grams of sodium nitrite are dissolved in 530 c. cs. of concentrated sulphuric acid, the solution warmed to 70° C., and then cooled to 10–15° C.

The diazotization is accomplished by adding solution (A) to (B) with stirring over a 30 minute period, maintaining meanwhile a temperature of 10–15° C., followed thereafter by stirring for another 30 minutes, and the addition of 10 grams of urea to remove any free nitrous acid. 1 mole of dimethyl-α-naphthylamine is dissolved in 1000 grams of acetic acid and the diazo solution prepared as described above is added slowly with stirring. The mixture is then neutralized with ammonium hydroxide using Congo red indicating paper, water added, and the dye salted out, filtered and dried. Cellulose acetate, silk and wool are colored reddish-blue shades from an aqueous suspension of the dye.

The azo compound has the formula:

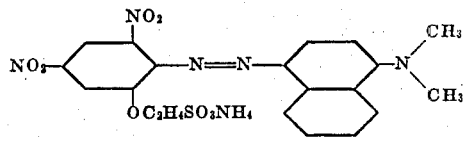

Another process of preparing the azo compounds of our invention is to prepare first the bromoalkoxyazobenzene intermediate and then substitute the bromine atom with a sulphonate group. This process is illustrated by the following example:

Example 5

1 mole of 4-(2'-β-bromoethoxy-4'-nitrophenylazo-)-3-β-methoxyethoxy-ethyl phenylaminobenzene is dissolved in boiling butanol and treated dropwise with stirring over a 15 hour period with a butanol solution containing 1 equivalent of sodium bisulfite. The dye compound obtained has the formula:

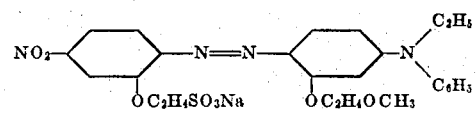

and colors cellulose acetate, silk and wool red shades from an aqueous solution of the dye which may contain salt.

The scope of our invention will be more fully apparent by reference to the following table, wherein are disclosed various suitable diazotization and coupling components, the dyes resulting therefrom coloring cellulose acetate fibers the shades of color designated. It should be noted that the sulfoalkoxy group may be in any ortho, meta, or para position to the amino group, in accordance with the possibilities of substitution of each specific diazo component disclosed. Thus for example, the first diazo component in the table may equally well be an m-sulfoethoxy-aniline, or a p-sulfoethoxy-aniline, the color obtained varying only slightly from the shades disclosed for the ortho compound.

| Diazo component | Coupling component | Shade on cellulose acetate |
|---|---|---|
| ⌬—NH$_2$ (OC$_2$H$_4$SO$_3$H) | Barbituric acid | Greenish-yellow. |
| Do. | Dimethyl dihydroresorcinol | Do. |
| Do. | 1-phenyl-3-methyl-5-pyrazolone | Do. |
| Do. | Acetoacetanilide | Do. |
| ⌬—NH$_2$ (OC$_2$H$_4$SO$_3$H) | Barbituric acid | Do. |
| Do. | Methyl dihydroresorcinol | Do. |
| Do. | p-Cresol | Yellow. |
| Do. | Dimethylaniline | Do. |
| Do. | Acetoacetanilide | Greenish-yellow. |
| Cl—⌬—NH$_2$ (OC$_2$H$_4$SO$_3$H) | Dimethyl dihydroresorcinol | Orange-yellow. |
| Do. | Dimethylaniline | Do. |
| Do. | Diphenylamine | Do. |
| Do. | m-Chloro-dimethylaniline | Do. |
| Do. | Dimethyl-m-toluidine | Do. |
| Do. | Dimethyl-m-anisidine | Do. |
| Do. | Cresidine | Do. |
| Do. | Diethyl cresidine | Do. |
| Do. | Diethyl isocresidine | Do. |
| Cl—⌬(Cl)—NH$_2$ (OC$_2$H$_4$(OC$_2$H$_4$)$_{2,3,\text{etc.}}$SO$_3$H) | Dibutylaniline | Orange-red. |
| Do. | Ethyl-β-hydroxyethylaniline | Do. |
| Do. | Di-β-hydroxyethyl cresidine | Red. |
| Do. | Di-β-hydroxyethyl isocresidine | Do. |
| Do. | 2,5-dimethoxyaniline | Do. |
| Do. | 2,5-dimethoxy-β-ethoxyethylaniline | Do. |

| Diazo component | Coupling component | Shade on cellulose acetate |
|---|---|---|
| NO$_2$—⟨⟩—NH$_2$, OC$_2$H$_4$OC$_2$H$_4$SO$_3$H | (1) Dimethyl dihydroresorcinol | Yellow. |
| Do | (2) Resorcinol monopropylether | Orange. |
| Do | (3) Diethylaniline | Red. |
| Do | (4) Diphenylamine | Do. |
| Do | (5) m-Chloro-dimethylaniline | Orange-red. |
| Do | (6) Dimethyl-m-toluidine | Red. |
| Do | (7) Dimethyl-m-anisidine | Rubine. |
| Do | (8) β-hydroxyethylaniline | Red. |
| Do | (9) γ-hydroxypropylaniline | Orange. |
| Do | (10) Cresidine | Red. |
| NO$_2$—⟨⟩—NH$_2$, OC$_3$H$_6$SO$_3$H | Couplers 1–10 | Yellow to reddish-orange. |
| NO$_2$—⟨⟩—NH$_2$, OC$_3$H$_6$SO$_3$H | Couplers 1–10 | Do. |
| NO$_2$—⟨⟩—NH$_2$, OC$_4$H$_8$SO$_3$H | Couplers 1–10 | Do. |
| NO$_2$, NO$_2$—⟨⟩—NH$_2$, OC$_2$H$_4$SO$_3$H | Dimethylaniline | Violet. |
| Do | Ethyl cetylaniline | Rubine. |
| Do | Di-β-hydroxyethyl-m-chloroaniline | Do. |
| Do | Di-β-hydroxyethyl-m-bromoaniline | Do. |
| Do | Di-β-hydroxyethyl-m-fluoroaniline | Do. |
| Do | Di-β-hydroxyethyl-m-toluidine | Violet. |
| Do | Di-β-hydroxyethyl-m-anisidine | Do. |
| Do | β-Hydroxyethylaniline | Do. |
| Do | Di-β-hydroxyethylaniline | Do. |
| Do | Ethyl-β-hydroxyethyl-cresidine | Purple. |
| Do | Glyceryl cresidine | Do. |
| Do | Dimethyl cresidine | Do. |
| Do | Diethyl isocresidine | Do. |
| Do | 2,6-dimethoxy-β-hydroxyethyl aniline | Do. |
| Do | 2,6-dimethoxy-glycerylaniline | Do. |
| Do | 2,5-dimethoxyaniline | Do. |
| Do | 4-acetamino-2-ethyl-glycerylamino phenetole | Blue. |
| Do | 2,5-dimethoxy-β-methoxyethyl-β-hydroxyethyl aniline | Do. |
| Do | α-Naphthylamine | Violet. |
| Do | Dimethyl-α-naphthylamine | Blue. |
| Do | Glyceryl-α-naphthylamine | Red-blue. |
| NO$_2$—⟨⟩—NH$_2$ (naphthalene), OC$_2$H$_4$SO$_3$Na | Dimethylaniline | Purple. |
| Do | Dimethyl-α-naphthylamine | Blue. |
| H$_2$N—⟨⟩—⟨⟩—NH$_2$, OC$_2$H$_4$SO$_3$Na, OC$_2$H$_4$SO$_3$Na | Dimethyl-α-naphthylamine | Red. |

In the application of the azo compounds of our invention to the coloration of organic derivatives of cellulose, silk, and wool, the dye compound may be formed on the fiber by diazotizing the desired amine and coupling with the developer in situ, or the dye compound may first be prepared in the manner described and then applied to the material to be colored from an aqueous solution or suspension of the dye. Since most of the azo compounds of the invention are water-soluble, they can ordinarily be applied directly from an aqueous solution containing salt without the necessity of employing a dispersing or solubilizing agent. For a more detailed description as to how the water-soluble members of our dye compounds may be employed for the coloring of fibrous materials, reference may be had to the general methods described in McNally and Dickey U. S. Patent No. 2,107,898, issued February 8, 1938. Where the particular dye compound is only slightly or moderately soluble in water, it is first ground to a paste with a dispersing agent such as a soap, a sulfonated oil, or a higher fatty acid glyceryl sulfate, and the resulting paste then dispersed in water. The material to be colored is immersed in this dispersion starting with a bath temperature of approximately 45–55° C., and then gradually increasing the temperature to 80–85° C., at which point it is maintained for several hours. Sodium chloride may be added to facilitate exhaustion of the dye bath during the dyeing operation. When the material has acquired the desired shade, it is removed from the bath, washed with soap, rinsed and dried.

While our invention is illustrated more particularly in connection with cellulose acetate, a material to which the invention is especially adapted, it will be understood that the azo dye compounds above described are not limited exclusively to cellulose acetate, but are likewise applicable for coloring organic derivatives of cellulose in general, including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose acetate-butyrate, and cellulose ethers such as methyl cellulose, ethyl cellulose, and benzyl cellulose.

We claim:

1. The azo compounds having the general formula:

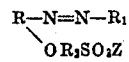

wherein R represents a benzene nucleus, $R_1$ represents a heterocyclic coupling component nucleus, $R_2$ represents an alkylene group of at least two carbon atoms, and Z represents a member selected from the group consisting of hydrogen, a nitrogen base group, and an alkali forming metal.

2. The azo compound having the general formula:

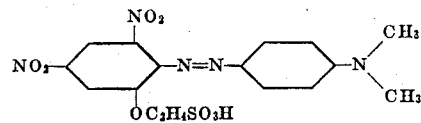

JOSEPH B. DICKEY.
JAMES G. McNALLY.